STAGGERED ATTENUATOR FOR TRAVELING-WAVE TUBES

Filed Dec. 6, 1967

INVENTOR
HINRICH HEYNISCH

BY *Hill, Sherman, Meroni, Gross + Simpson*
ATTORNEYS

United States Patent Office 3,510,721

Patented May 5, 1970

3,510,721

STAGGERED ATTENUATOR FOR TRAVELING-WAVE TUBES

Hinrich Heynisch, Grafelfing, Germany, assignor to Siemens Aktiengesellschaft, Munich, Germany, a corporation of Germany Filed Dec. 6, 1967, Ser. No. 688,587
Claims priority, application Germany, Dec. 29, 1966, S 107,659
Int. Cl. H01j *25/34*
U.S. Cl. 315—3.5 5 Claims

ABSTRACT OF THE DISCLOSURE

An attenuation for a traveling-wave tube having a delay line with the attenuator formed of at least two portions arranged along the longitudinal axis of the tube and mounted at different points. The attenuator portions may have tapered characteristics to minimize reflections.

BACKGROUND OF THE INVENTION

Field of the invention

This invention relates to an attenuation arrangement for traveling-wave tubes having a delay line which contains an attenuation zone between its input and output consisting of low-reflection attenuation elements of lossy material. Traveling-wave tubes contain delay lines which directly connect the tube output to the input. Internal feedback may cause self-excitation of the tube due to undesired reflections in the delay line. To prevent such self-excitation, it is common to incorporate in the delay line of traveling-wave tubes, an attenuator of lossy material in the field of the wave which travels on the delay line.

Description of the prior art

In traveling-wave tubes having as delay line a helix sustained between dielectric bars, a layer of lossy material has been employed to obtain a concentrated attenuation zone. For example, a graphite layer which is staggered on the bars of dielectric material serving as a helix holder. Such attenuation arrangement is, for example, shown in German Pat. 932,731. This patent shows a structure with a lossy layer in which the thickness of the layer is gradually reduced toward its ends by tapering. This patent also shows tapering of the attenuation zone by directing the lossy material out of the direct high-frequency field of the helical line in the form of a strip of constant layer thickness. French Pat. 1,363,759 discloses a concentrated zone of attenuation in delay lines without dielectric holder in which massive elongated attenuation bodies are mounted in the delay line. These attenuation bodies are pointed on their ends in order to reduce the reflections of the waves to be amplified. Tapered attenuation elements, as disclosed in these patents, merely reduces reflections and are usually insufficient for traveling-wave amplifier tubes having large band widths. It is also difficult to repeatedly and accurately create the gradual rise of the attenuation value of the attenuation elements. A particular difficult problem is to match the apparatus during operating conditions of the tube. This is called the "hot matching" problem. This problem occurs particularly at the end of the attenuator near the tube output which, in broad-band amplifier tubes, is practically never free from reflection of a certain portion of the power to be coupled out of the tube. If the reflected portion of the wave being amplified is again partially reflected during the transition to the next zone of attenuation, the interference effect is increased due to the amplifying property of the electron beam.

SUMMARY OF THE INVENTION

It is an object of the present invention to create an attenuation arrangement which is largely free from reflection in traveling-wave tubes which is relatively inexpensive.

A feature of the invention is found in the provision for an arrangement of lossy attenuators in traveling-wave tubes in which at least two attenuators are staggered along the longitudinal axis of the tube by a distance at least equal to half the wavelength of the middle frequency of the delay line.

The invention eliminates mismatches between attenuators by staggering them within the attenuation zone. This arrangement of the attenuation elements is also easy to reproduce during production.

The invention can very practically and simply be utilized in traveling-wave tubes having a helical line supported between two or more dielectric bars attaching a lossy attenuator to each bar along the edges of the turns of the helix, so that the attenuators are separated from one another and are arranged in a staggered position. The invention also proposes staggering attenuators longitudinally by at least a half wavelength at the operating frequency of the delay line. Such an arrangement produces improved attenuation characteristics.

Further objects, advantages and features of this invention will become apparent from the following description and claims when read in view of the drawings, in which:

DESCRIPTION OF THE PREFERRED EMBODIMENTS

Figure 1:
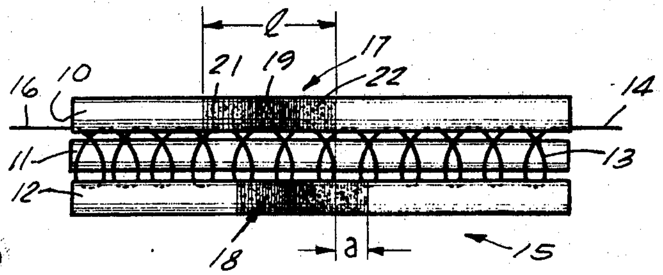
FIG. 1 is a diagrammatic view of an attenuation arrangement in a traveling-wave tube which has a helix as the delay line.

FIG. 1 illustrates a helix 13 having ends 14 and 16 of a traveling-wave tube designated generally as 15. For simplicity, the electron gun and receiver are not shown. Neither are the input or output couplings, since these are well known to those skilled in the art.

The helix 13 is supported between three rods or bars 10, 11 and 12 of dielectric material. A first layer 17 of attenuation material is formed on the surface of rod 10. The layer 17 may be of carbon, for example, and extends for a length "*l*" along the rod. The layer of carbon is thicker at the middle 19 and tapers so that it is thinner at the ends 21 and 22.

A second layer 18 of attenuation material is formed on the surface of rod 12 and is similar to layer 17. However, layer 18 is off longitudinally from layer 17 a distance "*a*." The layer 18 is also tapered so that greater attenuation occurs at its center.

The distance "*a*" is equal to or greater than a half line wavelength at the center operating frequency of the tube. The half line wave length means the distance covered by the waves to be amplified along the length of the delay line with a phase rotation of 360 degrees.

Although only two of the three rods 10, 11, and 12 are shown with attenuating layers, it is to be realized that all three may carry such layers.

Figure 2:
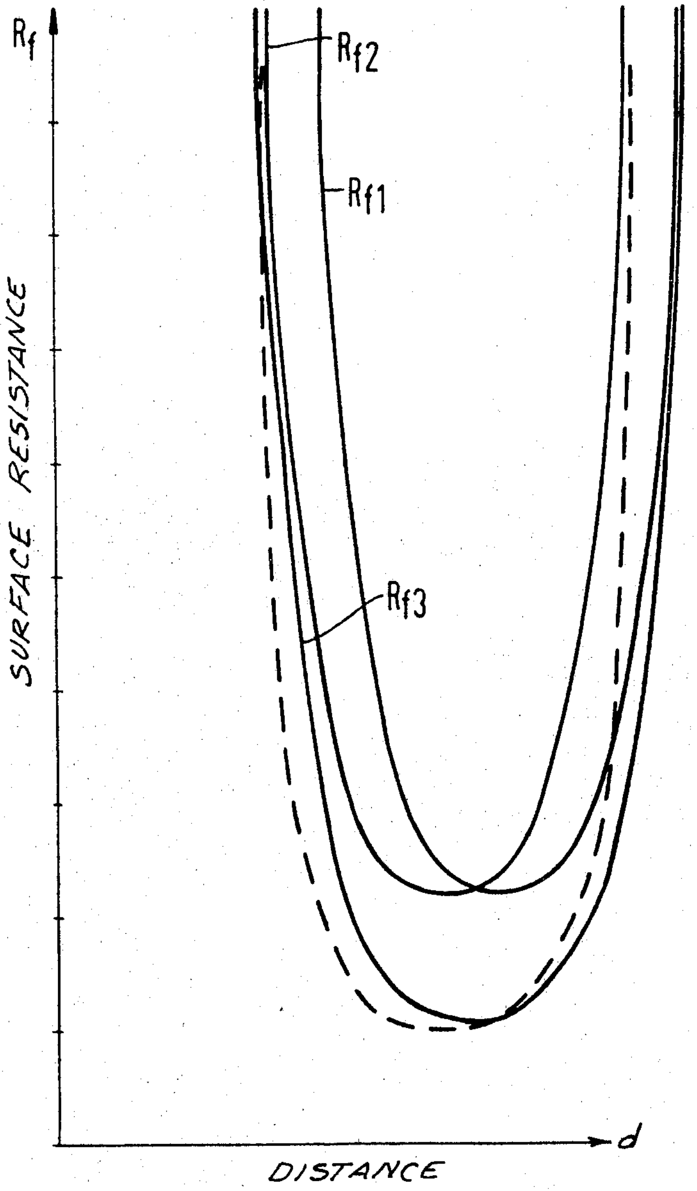
FIG. 2 is a plot of surface resistance against distance along the delay line.

The layers 17 and 18 form lossy areas which attenuate energy traveling through the tube 15. They absorb and minimize undesired reflected energy in the tube as illustrated in FIG. 2.

Surface resistance is plotted against distance along the tube. Curve $Rf_1$ is a plot of the surface resistance of layer 18. Curve $Rf_2$ is a plot of the surface resistance of layer 17. Currve $Rf_3$ illustrates the combined surface resistance of staggered layers 17 and 18.

The dotted curve illustrates the surface resistance of a pair of layers similar to 17 or 18 which are not staggered. It is to be noted that the staggered arrangement produces a curve $Rf_3$ which the convergence on the smallest resistance value (corresponding to maximum attenuation) is substantially flatter than in unstaggered or individual attenuators.

The invention teaches staggering attenuators along a traveling-wave tube. The attenuators may be formed of zones which are formed to provide a tapered impedance characteristic. It is important if a number of attenuation zones are formed in the tube to construct the zone adjacent the exit of the electron beam according to this invention.

The principles of the invention explained in connection with the specific exemplifications thereon will suggest many other applications and modifications of the same. It is accordingly desired that in constructing the breadth of the appended claims they shall not be limited to the specific details shown and described in connection with the exemplifications thereof.

I claim:

1. Attenuation arrangement for traveling wave tubes with a delayed action conduit containing at least one attenuation path between its inlet and outlet, said path being built from several attenuation elements free from reflections and made of lossy-coated material, whereby in the attenuation path at least two attenuation elements partly overlap each other and are arranged in the longitudinal direction of the delay line and are staggered by a distance which is at least equal to half the operating wavelength of the delay line.

2. Attenuating means for a traveling wave tube having a helix delay line comprising, a first longitudinally extending dielectric member extending along said helix delay line and formed with a first area of coating of electrical conducting material for a portion of its length, a second longitudinally extending dielectric member extending along said helix delay line and formed with a second area of coating of electrical conducting material for a portion of its length, and said first and said second areas overlapping each other but offset from each other along the longitudinal axis of the helix delay line by a distance equal to at least one-half wavelength of the center operating frequency of said delay line.

3. Attenuating means for a traveling wave tube according to claim 2 wherein said first and second areas are formed of thicker layers of electrical conducting material in their center portions than at their end portions so that their attenuation characteristics are tapered.

4. Attenuating means according to claim 3 wherein said first and second areas are about the same length.

5. Attenuating means according to claim 4 comprising a third longitudinally extending dielectric member extending along said helix delay line and formed with a third area of coating of electrical conducting material for a portion of its length, and said third area about the same length as said first and second areas and overlapping at least one of said areas but offset therefrom along the longitudinal axis of the helix delay line by a distance equal to at least one-half wavelength of the center operating frequency of said delay line.

References Cited

UNITED STATES PATENTS

| | | | |
|---|---|---|---|
| 2,626,371 | 1/1953 | Barnett et al. | 315—3.6 |
| 2,660,689 | 11/1953 | Touraton et al. | 315—3.5 |
| 2,840,752 | 1/1958 | Cutler et al. | 315—3.5 X |
| 2,939,993 | 6/1960 | Zublin et al. | 315—3.5 |
| 2,944,181 | 7/1960 | Rogers | 315—3.5 |
| 2,947,907 | 7/1960 | Bodmer | 315—3.5 |

FOREIGN PATENTS

| | | |
|---|---|---|
| 213,144 | 2/1958 | Australia. |

HERMAN KARL SAALBACH, Primary Examiner

S. CHATMON, Jr., Assistant Examiner

U.S. Cl. X.R.

315—3.6; 333—81